United States Patent [19]

Katabami et al.

[11] Patent Number: 5,596,747
[45] Date of Patent: Jan. 21, 1997

[54] METHOD AND APPARATUS FOR REORGANIZING AN ON-LINE DATABASE SYSTEM IN ACCORDANCE WITH AN ACCESS TIME INCREASE

[75] Inventors: Nobue Katabami, Tokyo; Tadashi Itoh; Yasutomo Takahashi, both of Hokkaido, all of Japan

[73] Assignee: NEC Corporation, Tokyo, Japan

[21] Appl. No.: 456,610

[22] Filed: Jun. 1, 1995

Related U.S. Application Data

[63] Continuation of Ser. No. 979,771, Nov. 20, 1992, abandoned.

[30] Foreign Application Priority Data

Nov. 27, 1991 [JP] Japan ................... 3-335991

[51] Int. Cl.$^6$ ................... G06F 17/30; G06F 12/00
[52] U.S. Cl. ................... 395/612; 395/494; 395/182.05; 395/182.13; 364/DIG. 1; 364/282.1; 364/283.4; 364/251.4
[58] Field of Search ................... 395/600, 494, 395/182.05, 182.13; 364/DIG. 1

[56] References Cited

U.S. PATENT DOCUMENTS

| | | | |
|---|---|---|---|
| 4,680,703 | 7/1987 | Kriz | 364/200 |
| 4,680,705 | 7/1987 | Shu | 395/600 |
| 4,807,224 | 2/1989 | Naron | 371/32 |
| 5,222,233 | 6/1993 | Parks | 395/600 |
| 5,333,311 | 7/1994 | Whipple, II | 395/600 |
| 5,408,654 | 4/1995 | Barry | 395/600 |

OTHER PUBLICATIONS

ACOS Software ACOS–4/MVP XE ADBS Operation Guide, Published by NEC Corporation, (Oct. 1990).

*Primary Examiner*—Wayne Amsbury
*Assistant Examiner*—Jean R. Homere
*Attorney, Agent, or Firm*—Foley & Lardner

[57] ABSTRACT

A database operation control system includes a database checker, a database saver, a database diagnoser, a logical image creator, a database creator, and a database restorer. The database checker checks an access time taken for retrieval processing, and records an access time increase in an access time record file. The database saver saves data from the database to a save file. The database diagnoser compares the access time increase with a reorganization start increase as a reference value obtained from the access time record file to diagnose whether recognition is necessary, and informs the database saver of the necessity of the execution of reorganization processing of the database, if it is determined that reorganization is required. The logical image creator decomposes data of the save file into logical units to create logical images, and stores them in a logical image file. The database creator creates a restoration file. The database restorer restores data from the restoration file to the database. Reorganization processing is automatically performed in accordance with the access time increase obtained by the database checker.

16 Claims, 10 Drawing Sheets

| DATABASE NAME : AAAAAAA | | REORGANIZATION START INCREASE : 1,500 | |
|---|---|---|---|
| DATE/TIME | AVERAGE ACCESS TIME | PROCESSING COUNT | ACCESS TIME INCREASE |
| 910101/12:34:35 | 1.123 | 278,000 | 0 |
| 910201/13:03:21 | 1.215 | 345,000 | 0.092 |
| | ⋮ | ⋮ | |

METHOD AND APPARATUS FOR REORGANIZING AN ON-LINE DATABASE SYSTEM IN ACCORDANCE WITH AN ACCESS TIME INCREASE

This application is a continuation, of application Ser. No. 07/979,771, filed Nov. 20, 1992, now abandoned.

BACKGROUND OF THE INVENTION

The present invention relates to a database operation control system for realizing reorganization processing of an online database in a computer system.

In a conventional online database system, the record storage status changes upon delete/add/update processing, and a correspondence error occurs between logical addresses for indicating the correlation of records and physical addresses actually stored. For this reason, retrieval processing in the order of the logical addresses cannot be performed in the order of the physical addresses, degrading processing efficiency. In order to improve the processing efficiency, reorganization processing is required.

A conventional database operation control system will be described below with reference to FIG. 10.

Figure 10:
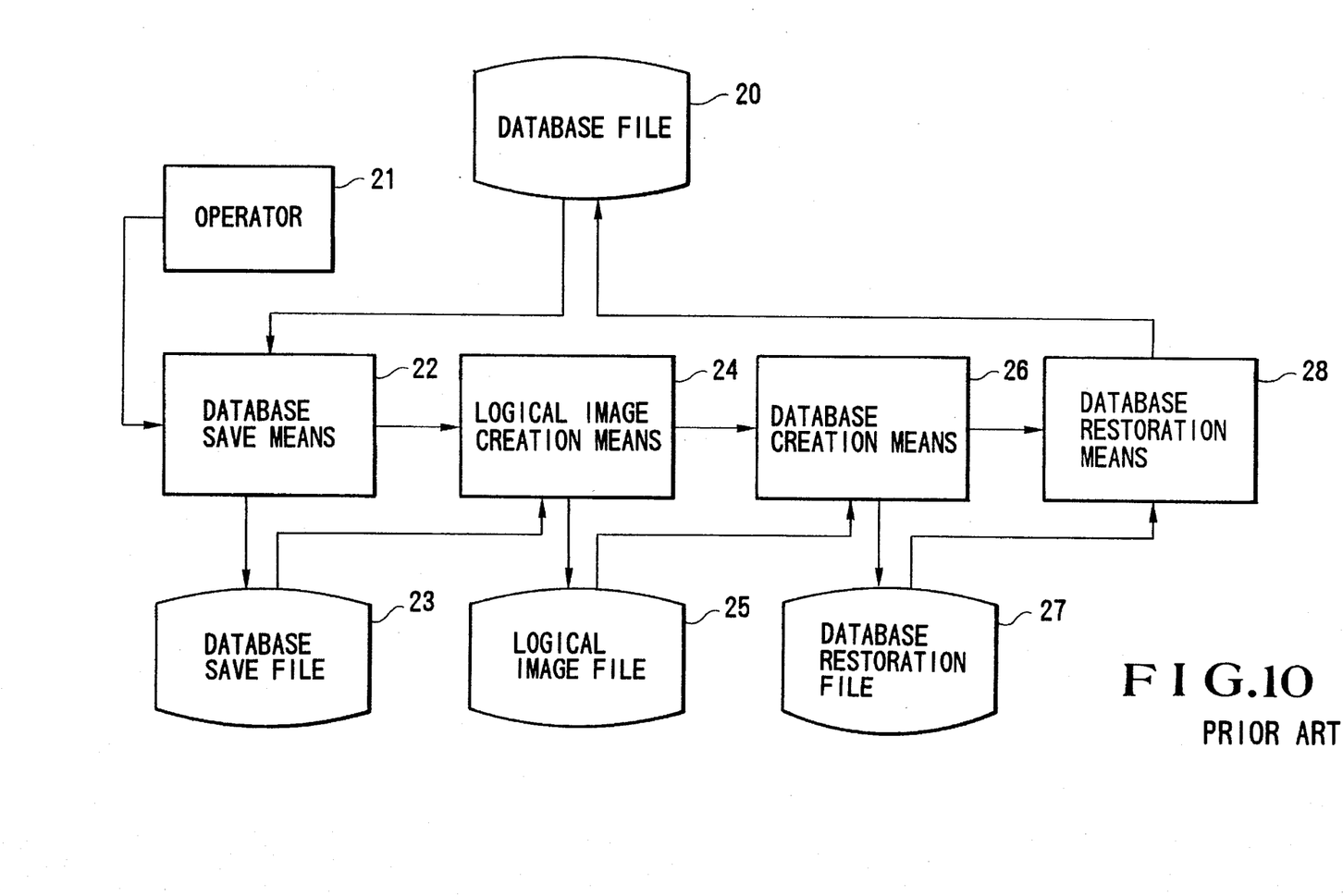
FIG. 10 is a block diagram showing a conventional database operation control system.

Referring to FIG. 10, reference numeral 20 denotes a database file (database); and 21, an operator. When reorganization is to be performed, the operator 21 checks on the basis of the processing time taken for an application to the database file 20 whether access efficiency is degraded upon delete/add/update processing of a record. If the access efficiency is degraded, reorganization processing is performed, as shown in FIG. 10.

A database save means 22 saves the database file 20 in a database save file 23. A logical image creation means 24 then creates a logical image from the database save file 23, and stores it in a logical image file 25.

Subsequently, a database creation means 26 optimizes the storage position of the data on the basis of the logical image file 25, and stores the image in a database restoration file 27.

A database restoration means 28 restores the image stored in the database restoration file 27 to the database file 20.

In this conventional database operation control system, the operator analyzes degradation of access efficiency, caused upon delete/add/update processing a record, on the basis of a change in the processing time taken for an application or the like and a change in data amount. If the operator determines that the access efficiency is considerably degraded, reorganization processing is executed.

The operator 21, therefore, must judge the necessity of reorganization in consideration of the storage status of records in the database and the validity of a processing time.

SUMMARY OF THE INVENTION

It is an object of the present invention to provide a database operation control system which reduces the load of an operator and allows easy execution of reorganization processing.

It is another object of the present invention to provide a database operation control system which can automatically perform reorganization processing when access efficiency is degraded.

In order to achieve the above objects, according to the present invention, there is provided a database operation control system in reorganization processing of a database, which is performed while an online database system is active, comprising database check means for sequentially retrieving relational records by using the database with an active online AP and logical addresses set to indicate correlation of records checking an access time taken for the retrieval processing, and recording an access time increase in an access time record file, database save means for saving data from the database to a save file, database diagnosis means for setting a reorganization start increase as a reference value for determining whether to execute reorganization, recording the reference value in the access time recording file, comparing the access time increase with the reorganization start increase obtained from the access time record file to diagnose whether reorganization is necessary, and informing the database save means that reorganization processing of the database must be executed, if the necessity of reorganization is determined, logical image creation means for decomposing data of the save file into logical units, creating logical images as records arranged in the order of logical values, and storing the logical images in a logical image file, database creation means for determining an optimal storage position from the logical image file and creating a restoration file, and restoration means for restoring data from the restoration file to the database, wherein reorganization processing is automatically performed in accordance with the access time increase obtained by the database check means.

DESCRIPTION OF THE PREFERRED EMBODIMENT

Figure 1:
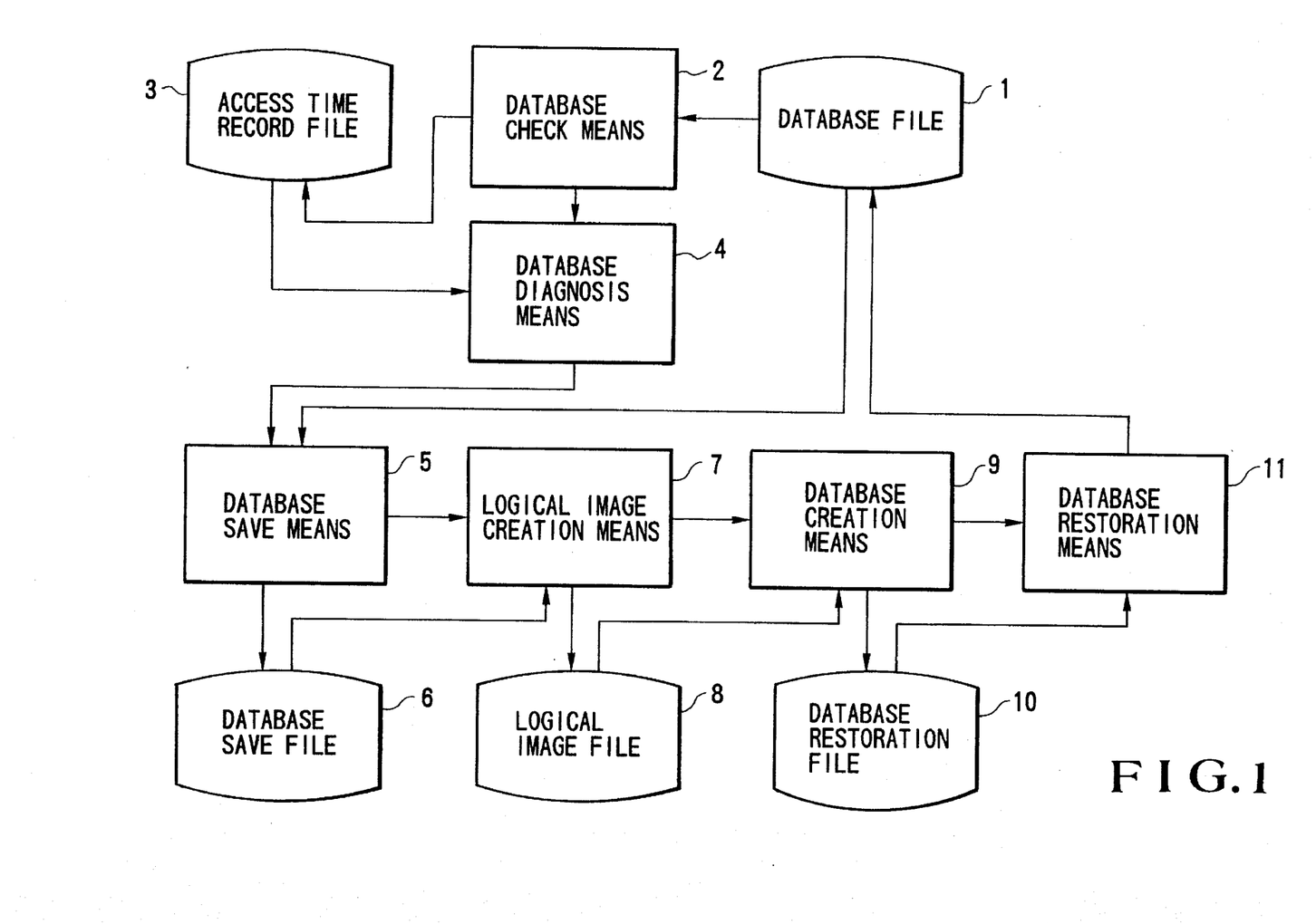
FIG. 1 is a block diagram showing a database operation control system according to an embodiment of the present invention.

FIG. 1 shows a database operation control system according to an embodiment of the present invention, specifically, an arrangement in which reorganization processing with respect to a database in an active online system is performed by the system.

Referring to FIG. 1, reference numeral 1 denotes a database file (database) in an active online AP; 2, a database check means for sequentially searching relational records in accordance with logical addresses set to indicate the correlation of records, checking the access time taken for this search, and recording the time in an access time record file 3; 5, a database save means for saving data from the database file 1 to a database save file (save file) 6; 4, a database diagnosis means for setting a reorganization start increase as a reference value for determining whether to execute reorganization, recording it in the access time record file 3, comparing an access time increase with the reorganization start increase obtained from the access time record file 3 to diagnose whether reorganization of the database file 1 is necessary, and informing the database save means 5 that reorganization processing of the database file 1 must be executed, if it is diagnosed that reorganization is required; 7, a logical image creation means for creating records arranged in the order of logical values (which records will be referred to as logical images hereinafter) by decomposing the data of the database save file 6 into logical units, and storing the images in a logical image file 8; 9, a database creation means for determining an optimal storage position from the logical image file 8 and creating a database restoration file (restoration file) 10; and 11, a database restoration means for restoring data from the database restoration file 10 to the database file 1.

The system is designed to automatically performing reorganization processing in accordance with the access time increase obtained by the database check means 2.

Figure 2:
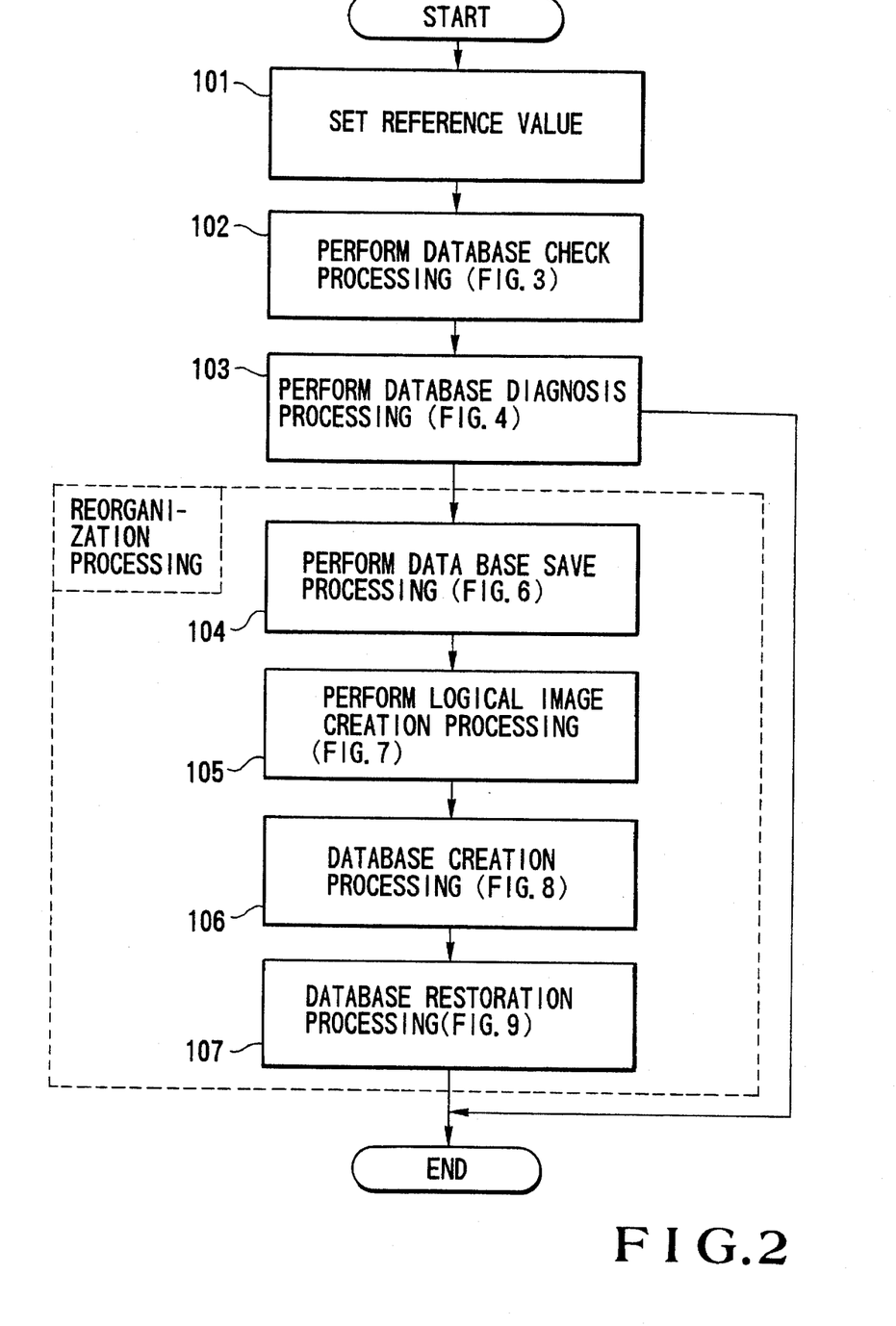
FIG. 2 is a flow chart showing a procedure of the database operation control system of the embodiment shown in FIG. 1.
Figure 3:
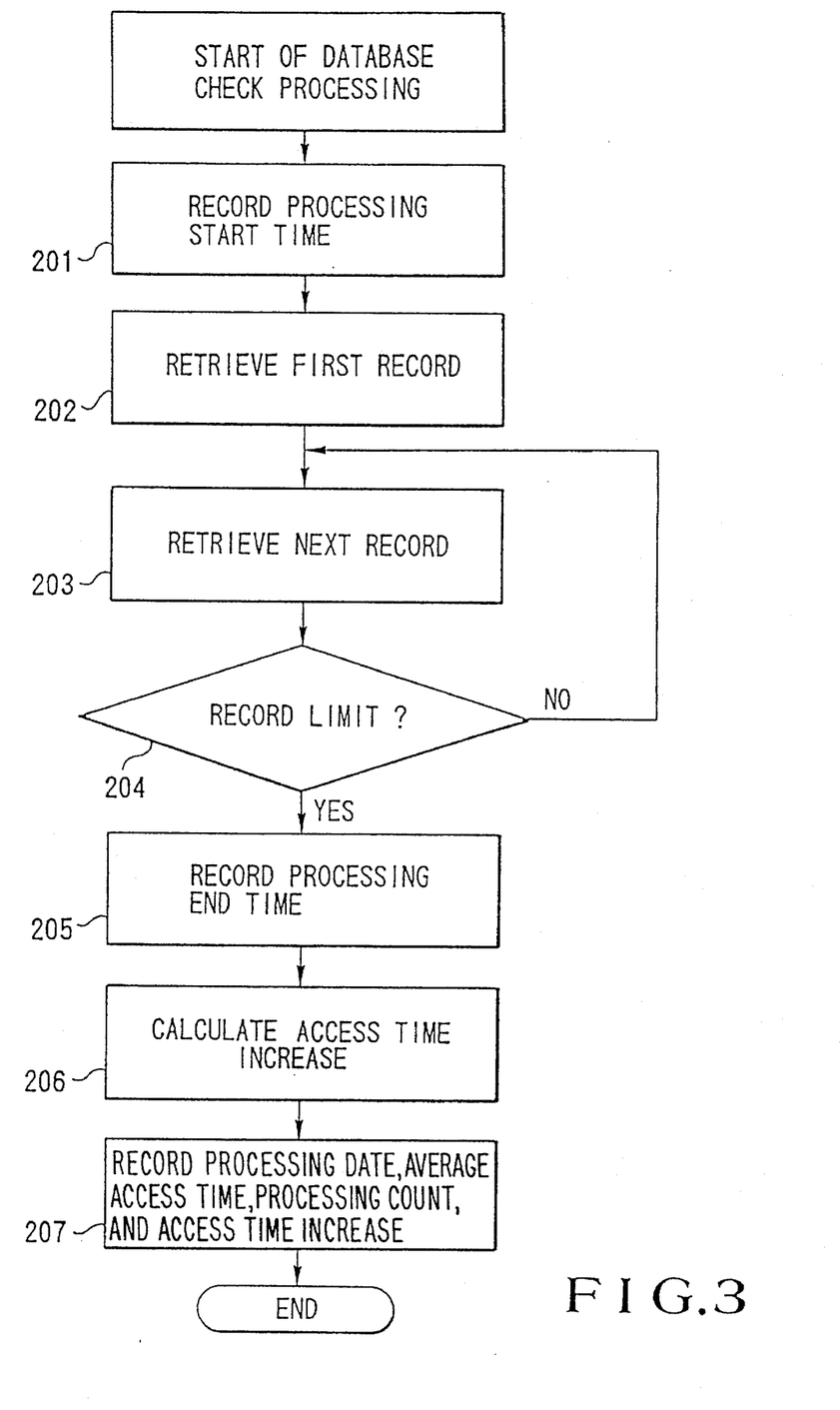
FIG. 3 is a flow chart showing a procedure of a database check means in FIG. 1.
Figure 4:
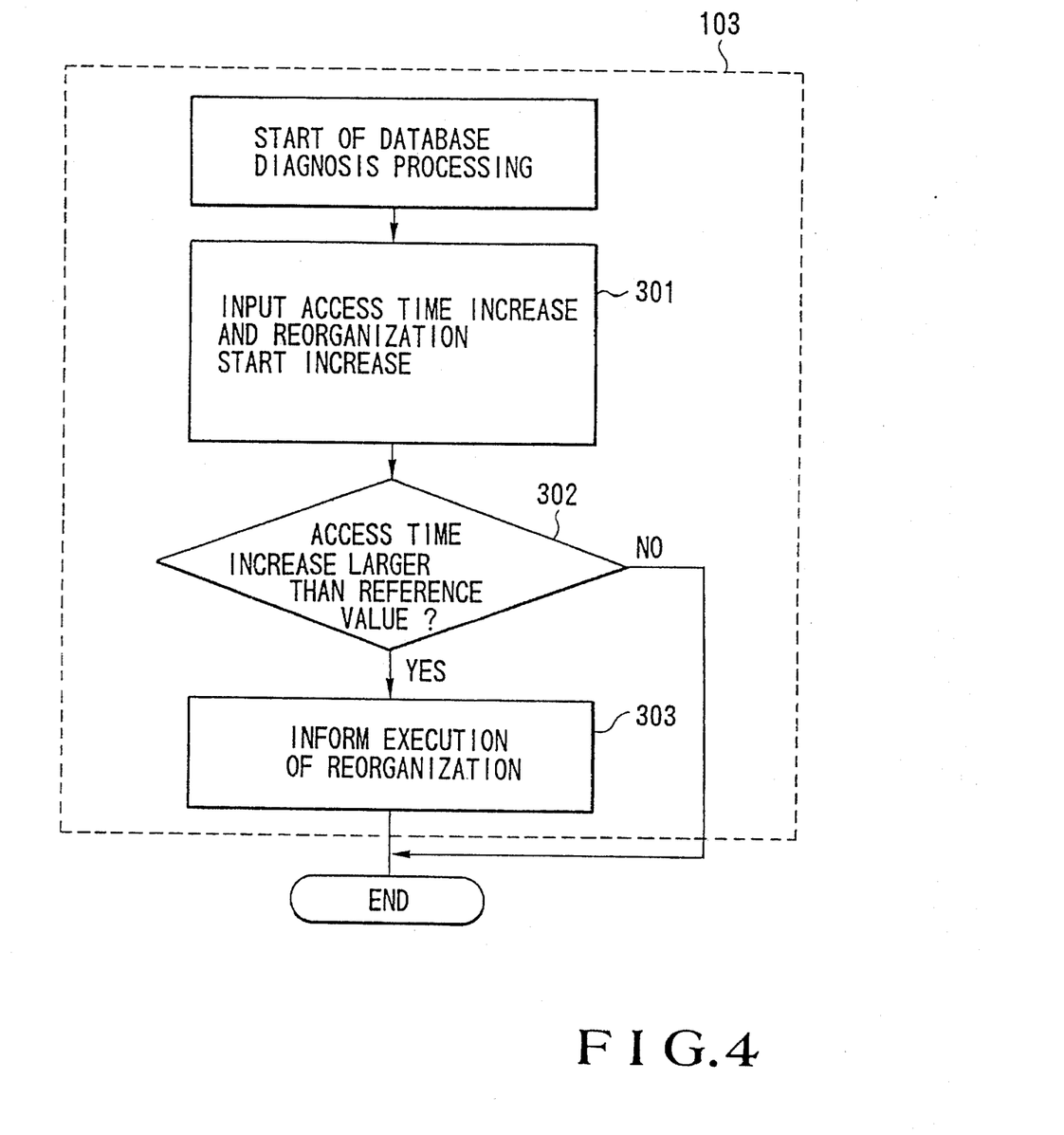
FIG. 4 is a flow chart showing a procedure of a database diagnosis means in FIG. 1.
Figure 5:
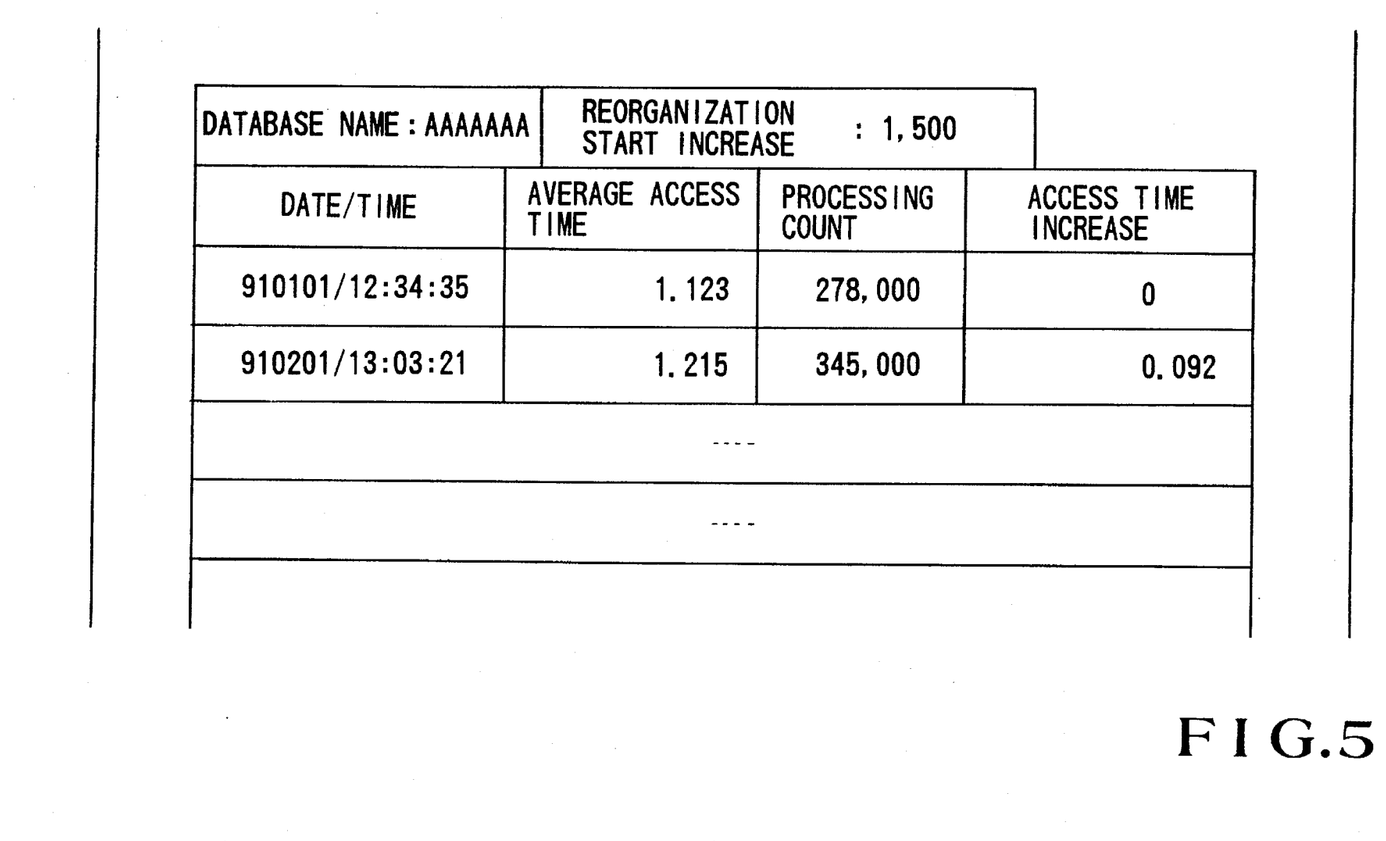
FIG. 5 is a view showing a format of an access time record file in FIG. 1.
Figure 6:
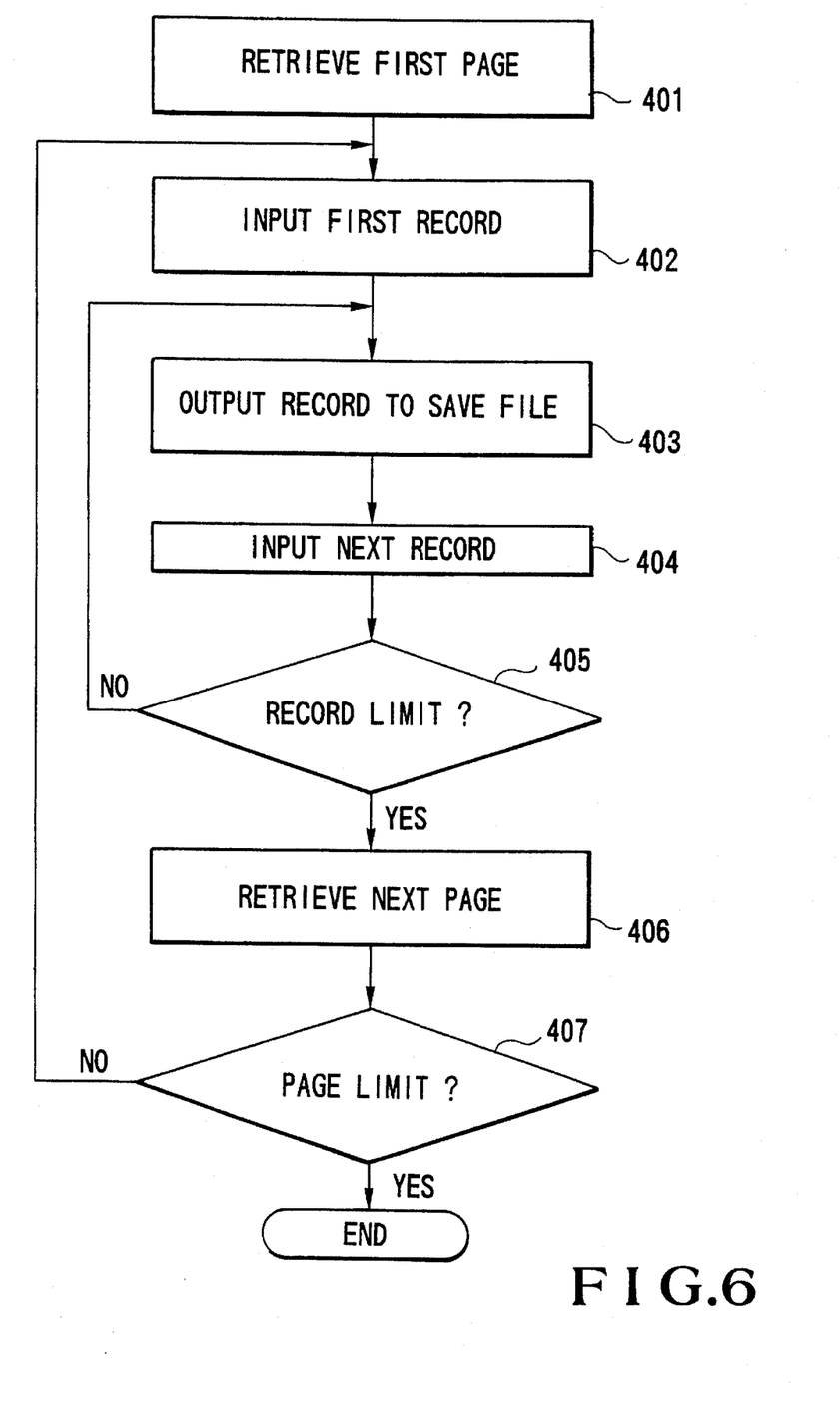
FIG. 6 is a flow chart showing a procedure of a database save means in FIG. 1.
Figure 7:
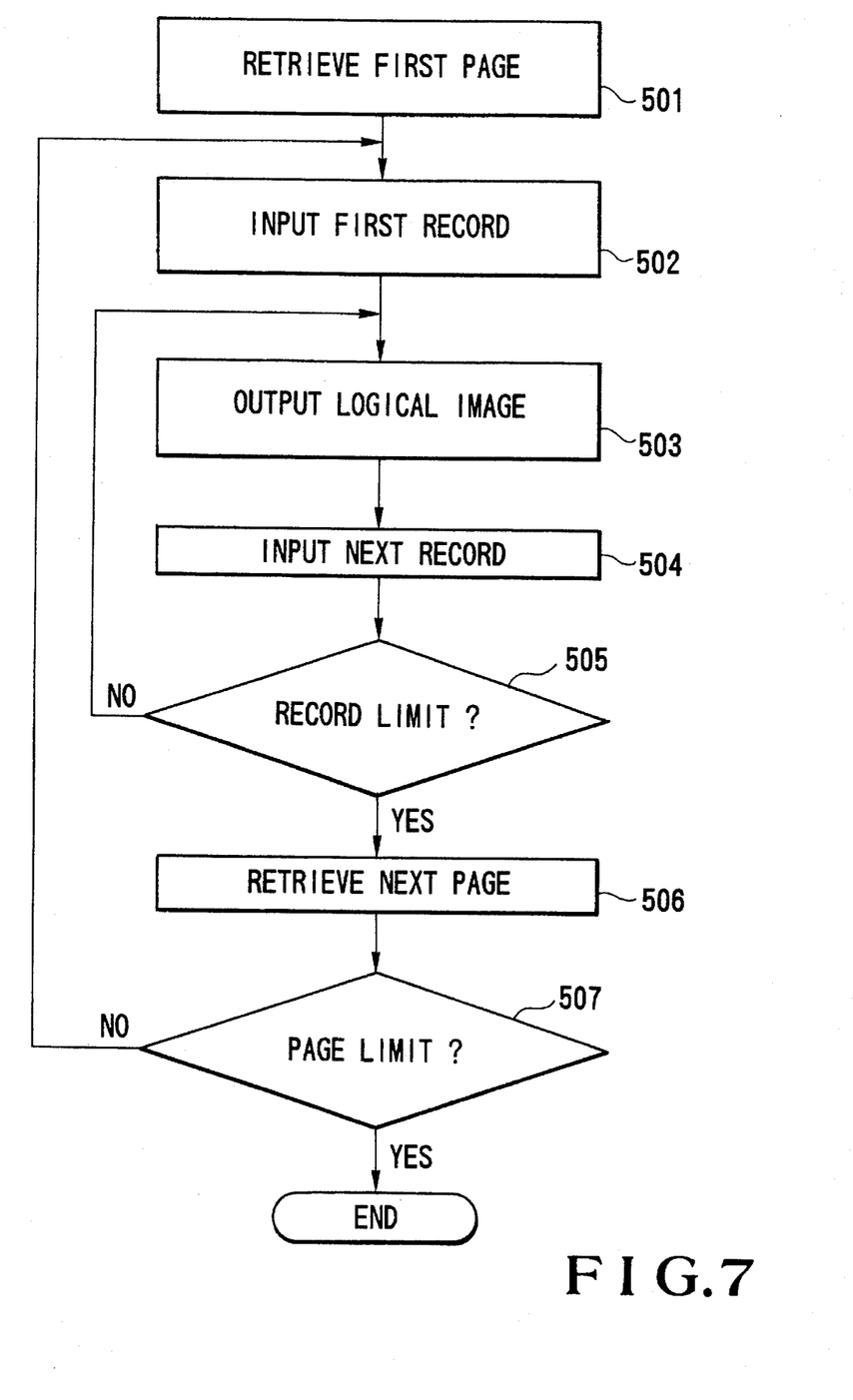
FIG. 7 is a flow chart showing a procedure of a logical image creation means in FIG. 1.
Figure 8:
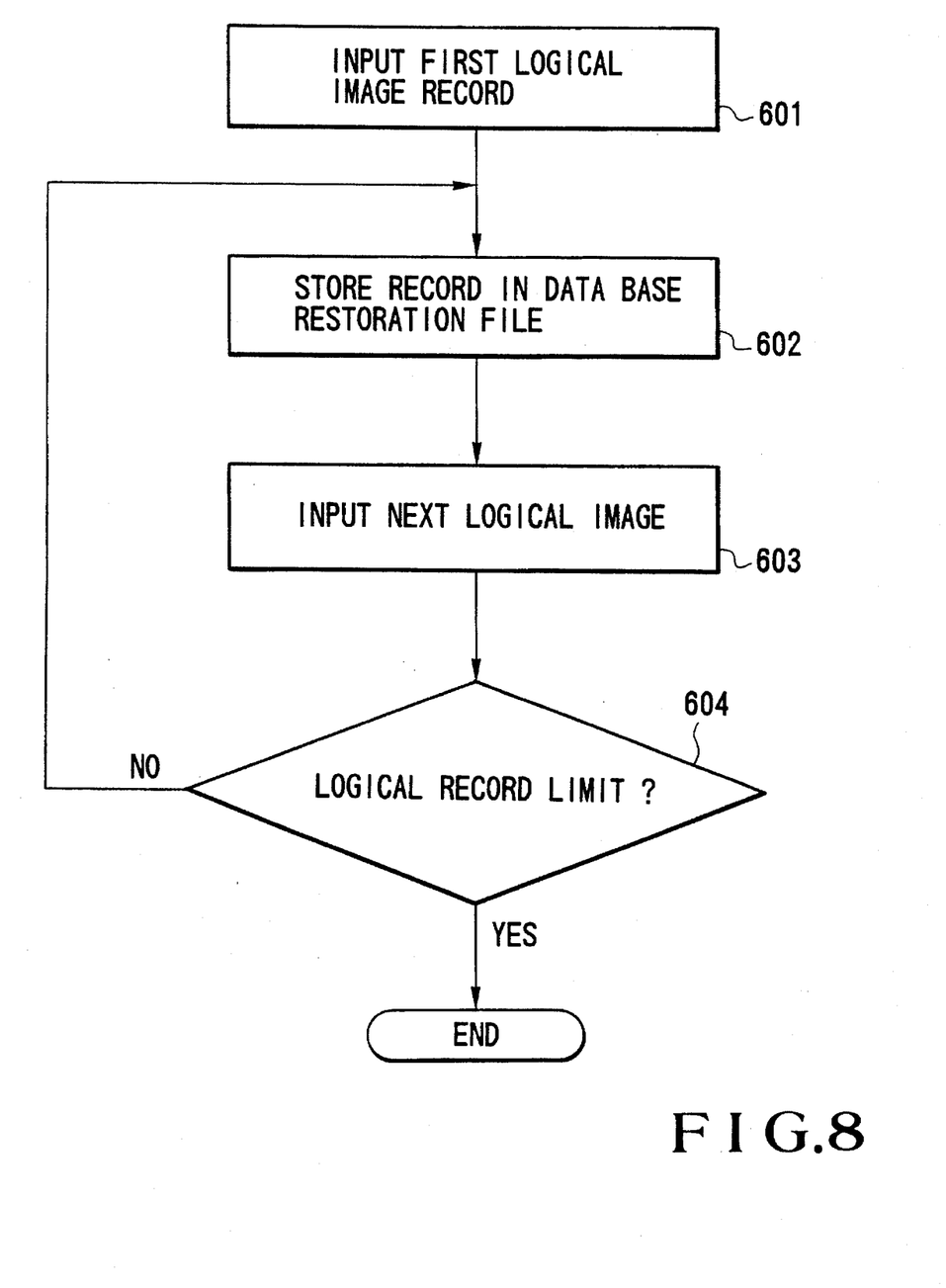
FIG. 8 is a flow chart showing a procedure of a database creation means in FIG. 1.
Figure 9:
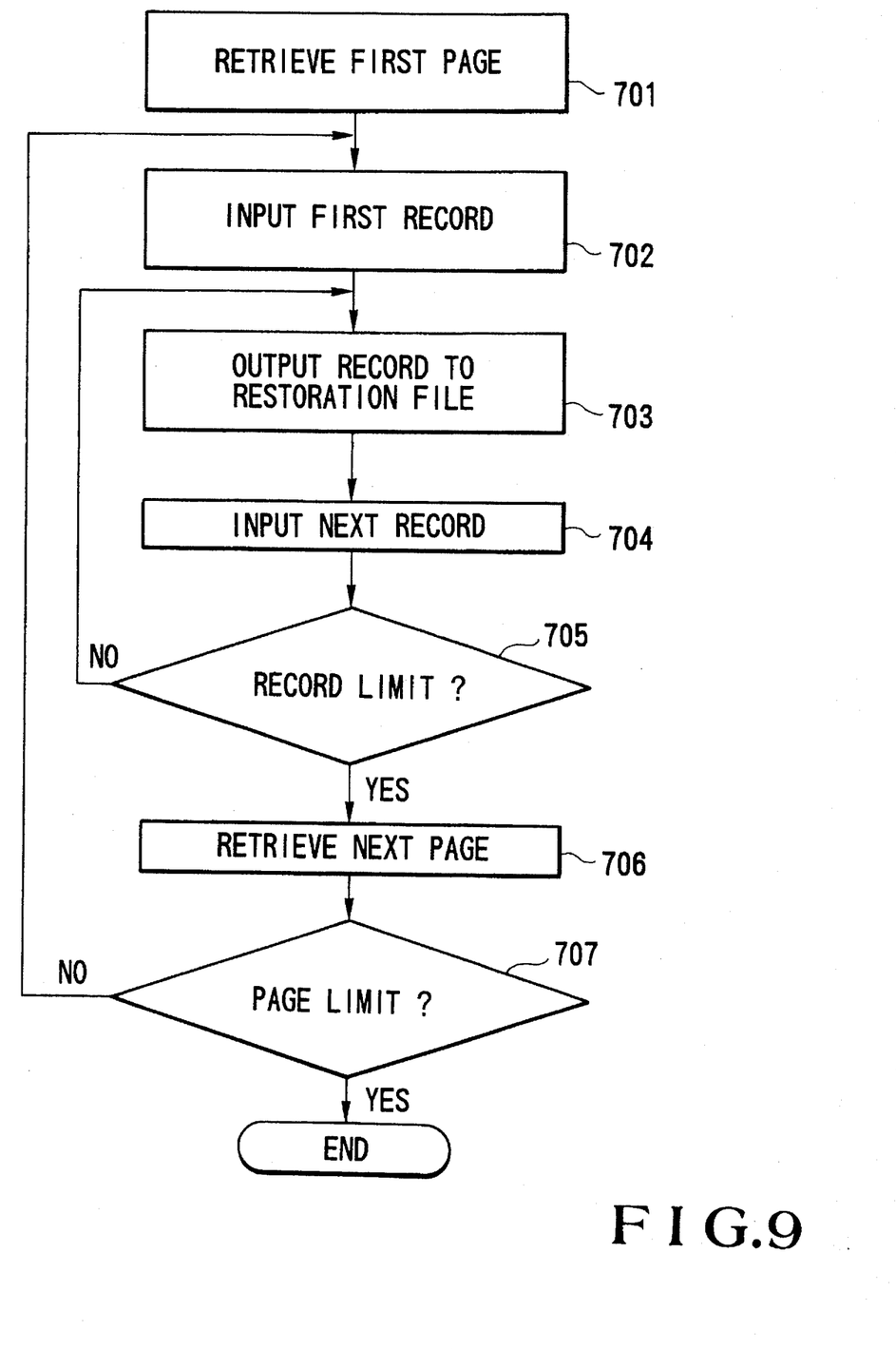
FIG. 9 is a flow chart showing a procedure of a database restoration means in FIG. 1.

FIG. 2 shows a procedure of the database operation control system of the embodiment shown in FIG. 1. FIG. 3 shows a procedure of the database check means 2 in FIG. 1. FIG. 4 shows a procedure of the database diagnosis means 4 in FIG. 1. FIG. 5 shows an arrangement of the access time record file 3 in FIG. 1. FIG. 6 shows a procedure of the database save means 5 in FIG. 1. FIG. 7 shows a procedure of the database save means 5 in FIG. 1. FIG. 8 shows a procedure of the database creation means 9 in FIG. 1. FIG. 9 shows a procedure of the database restoration means 11 in FIG. 1.

An operation of the embodiment shown in FIG. 1 will be described below with reference to FIGS. 2 to 9.

The procedure of the database operation control system of the present invention will be described first with reference to FIG. 2.

An operator sets an access time increase with respect to the timing of data storage in the database file 1 as a reference value for determining whether to execute reorganization, and records it in the access time record file 3 together with a database name (step 101). Database check processing is performed by the database check means 2 to calculate an average access time on the basis of sequential retrieval times based on the logical addresses of relational records (step 102). Data base diagnosis processing is then performed by the database diagnosis means 4 to check whether the calculated value exceeds the reference value (step 103).

If YES in step 103, database save processing is performed by the database save means 5 to create a save file (step 104). Logical image creation processing is then performed by the logical image creation means 7 to create a logical image (step 105). Database creation processing is performed by the database creation means 9 to create the restoration file 10 (step 106). Finally, database restoration processing is performed by the database restoration means 11 to restore the reorganized data to the database (step 107).

A procedure of the database check means 2 will be described with reference to FIG. 3.

A processing start time is recorded in step 201. The first record of the records designated by the logical addresses in a database is retrieved (step 202). The next record of the records arranged in the order of logical values is retrieved (step 203). This processing is repeated until all the records are retrieved (step 204). At the end of the retrieval processing, the end time is recorded (step 205). An access time increase is calculated from the access time and the initial storage timing (step 206). The processing date, the average access time, the processing count, and the access time increase are recorded in the access time record file, thus checking the storage status of the database (step 207).

A procedure of the database diagnosis means 4 will be described below with reference to FIG. 4.

The access time increase with respect to an initial storage status and a reorganization start increase as a reference value for reorganization are input from the access time record file 3 (step 301). It is then checked whether the access time increase exceeds the reorganization start increase (step 302). If YES in step 302, the necessity of the execution of reorganization processing is informed to the database save means 5 (step 303). If NO in step 302, the processing is ended.

A procedure of the database save means 5 will be described below with reference to FIG. 6.

A page having the minimum value as a physical address of a database is retrieved first (step 401). A record having the minimum address in the page is input (step 402). The input record is output to the database save file 6 (step 403). The next record in the page is input (step 404). The above processing is repeated until all the records in the page are input (step 405).

The next page is retrieved as a physical address of the data base (step 406). This processing is repeated until all the pages are processed (step 407).

A procedure of the logical image creation means 7 will be described below with reference to FIG. 7.

The first page of the database save file 6 is retrieved (step 501). The first record is the input (step 502). The record is decomposed into logical units to create a logical image, and the logical image is output to the logical image file 8 (step 503). The next record is then input (504). The above processing is performed with respect to all the records in the page (step 505).

If no record is present in the page, the next page is retrieved (step 506). The above processing is repeated until all the pages are processed (step 507).

A procedure of the database creation means 9 will be described below with reference to FIG. 8.

The first logical image record is input (step 601). The storage position of the data is optimized, and the image is stored in the database restoration file 10 (step 602). The next logical image is input (step 603). It is then checked in step 604 whether the logical record reaches a limit. If NO in step 604, the flow returns to step 602. The above processing is repeated until a logical record reaches the limit, i.e., all the logical image records are read.

A procedure of the database restoration means 11 will be described below with reference to FIG. 9.

The first page is retrieved (step 701). The first record is the input (step 702). The record is stored at an optimized position in the restoration file (step 703).

The next record is input (step 704). The above processing is repeated until all the records are processed (step 705). When no record is present, the next page is retrieved (step 706). The above processing is repeated until all the pages are retrieved (step 707).

As has been described above, according to the present invention, the storage status is determined on the basis of an access time with respect to a database, and reorganization processing is automatically executed when the access time is prolonged. Therefore, the load of an operator is reduced, and reorganization processing can be easily executed.

When the access efficiency is degraded, reorganization processing of a database file can be automatically executed by simply measuring an access time.

What is claimed is:

1. A database operation control system for reorganization processing of a database, which is performed while an online database system is active, comprising:

database check means for sequentially retrieving relational records from said database with an active online application program and logical addresses set to indicate correlation of the relational records, checking an access time taken for the retrieval, calculating an increase in access time from the access time and a previous access time and recording the access time increase in an access time record file;

database save means for saving data from said database to a save file;

database diagnosis means for obtaining a reorganization start increase from said access time record file as a reference value for determining whether to execute reorganization, comparing the access time increase obtained from said database check means with the reorganization start increase obtained from said access time record file, diagnosing that reorganization is necessary when the access time increase exceeds the reorganization start increase, and informing said database save means that reorganization processing of said database must be executed if the necessity of reorganization is determined;

logical image creation means for decomposing data of said save file into logical units, creating logical images as records arranged in the order of logical values, and storing the logical images in a logical image file;

database creation means for determining an optimal storage position for data in said logical image file, creating a restoration file and storing said logical images in said logical image file at said optimal storage position in said restoration file; and restoration means for restoring data from said restoration file to said database, such that reorganization processing is performed in accordance with the access time increase obtained by said database check means.

2. The database operation control system as claimed in claim 1, wherein the database check means further records a processing date, an average access time, and a processing count in the access time record file.

3. The database operation control system as claimed in claim 1, wherein the database check means records a processing start time prior to retrieving the relational records, records an end time at an end of retrieving the relational records, and calculates the access time based on a difference between the start time and the end time.

4. The database operation control system as claimed in claim 1, wherein a user of said database sets the reference value, which is stored in said access time record file, for later retrieval by said database diagnosis means.

5. The database operation control system as claimed in claim 4, wherein a database identifier is stored along with the reference value in said access time record file.

6. The database operation control system as claimed in claim 1, wherein said database check means calculates an average access time on a basis of sequential retrieval times based on logical addresses of the relational records, said average access time being output to said database diagnosis means as said access time increase.

7. The database operation control system as claimed in claim 6, wherein the reference value corresponds to the average access time calculated by said database check means at a time of initial storage of all of the relational records into said database.

8. The database operation control system as claimed in claim 7, wherein all of the relational records in said database are retrieved when determining the access time increase with said database check means.

9. A method for the reorganization processing of a database, in a database operation control system, performed while an online database system is active, comprising the steps of:

sequentially retrieving relational records from said database with an active online application program and logical addresses set to indicate correlation of the relational records, checking an access time taken for the retrieval, calculating an increase in access time from the access time and a previous access time and recording the access time increase in an access time record file;

saving data from said database to a save file;

setting a reorganization start increase as a reference value for determining whether to execute reorganization, recording the reference value in said access time record file, comparing the access time increase with the reorganization start increase, diagnosing that reorganization is necessary when the access time increase exceeds the reorganization start increase, and beginning said saving data step if the necessity of reorganization is determined;

decomposing data of said save file into logical units, creating logical images as records arranged in order of logical values, and storing the logical images in a logical image file;

determining an optimal storage position for data in said logical image file, creating a restoration file, and storing said logical images in said logical image file at said optimal storage position in said restoration file; and restoring data from said restoration file to said database;

such that reorganization processing is performed in accordance with the access time increase.

10. The method as claimed in claim 9, wherein the recording step further comprises recording a processing date, an average access time, and a processing count in the access time record file.

11. The method as claimed in claim 9, further comprising the step of recording a processing start time prior to retrieving the relational records, recording an end time at an end of retrieving the relational records, and calculating the access time based on a difference between the start time and the end time.

12. The method as claimed in claim 9, wherein the setting of the reference value is performed by a user of said database.

13. The method as claimed in claim 12, wherein the user sets a database identifier that is stored along with the reference value in said access time record file.

14. The method as claimed in claim 9, wherein said access time increase is calculated by determining an average access time on a basis of sequential retrieval times based on logical addresses of the relational records, said average access time being output to said database diagnosis means as said access time increase.

15. The method as claimed in claim 14, wherein the reference value corresponds to the average access time calculated at a time of initial storage of all of the relational records into said database.

16. The method as claimed in claim 15, wherein all of the relational records in said database are retrieved when determining the access time increase.

* * * * *